UNITED STATES PATENT OFFICE.

ALBERT OETKER, OF OTTENSEN, NEAR ALTONA, GERMANY.

ELASTIC PADDING AND FILLING COMPOSITION.

1,087,815. Specification of Letters Patent. Patented Feb. 17, 1914.

No Drawing. Application filed March 7, 1913. Serial No. 752,758.

*To all whom it may concern:*

Be it known that I, ALBERT OETKER, manufacturer, a subject of the King of Prussia, residing at Ottensen, near Altona, in the Kingdom of Prussia, German Empire, have invented certain new and useful Improvements in Elastic Padding and Filling Composition, of which the following is a specification.

Articles made of vulcanized soft rubber are extensively used in various industries and trades, as well as for domestic purposes. Such articles must be frequently replaced owing to their becoming worn on one side or owing to their being damaged. For this reason, therefore, a large quantity of soft rubber accumulates from which, as is generally known, the caoutchouc can be recovered only with great difficulty. The following important economical and industrial problem has therefore arisen, namely the discovery of means for rationally and profitably utilizing old soft rubber. This also forms the object of the present invention, a further object of which is to manufacture an elastic padding and filling material, from such vulcanized soft rubber waste.

According to the present invention disintegrated soft rubber, ground so that it assumes the form of pieces or coarse powder, is combined by means of a binding agent into a mass which becomes soft when heated, and which becomes firm when allowed to cool. A mixture of gutta-percha with fat, paraffin and a small amount of resin is used as binding agent. A small quantity of caoutchouc may also be added to the mixture. The mixing proportions of the disintegrated soft rubber and binding agent may vary, according to the degree of disintegration of the soft rubber, and according to the particular purpose for which the filling or padding material is to be used. The most advantageous proportions for the ingredients forming the binding agent may be easily determined by preliminary experiments. The following are proportions which are suitable for many purposes: 50% of gutta percha, 10% of caoutchouc, 10% of resin, 30% of fat or paraffin.

The binding agent and the disintegrated rubber are mixed and worked up into a mass with the aid of heat in a suitable mixing machine. Disinfectants, such as benzoic acid or salicylic acid may, if desired, be added to the mass.

For the purpose of applying the padding or filling composition, it is heated, for instance, by placing it in hot water. The softened mass is then pressed into the space which is to be filled, for instance into the space within a horse shoe, so that the space is completely and tightly filled.

The composition, when used as a horse shoe padding or filling is superior to any other existing padding or insertion owing to its great elasticity and the possibility of obtaining a perfectly tight sealing in of the sole of the hoof.

The composition may also be used as floor covering or for the manufacture of floor coverings, such materials being both as regards elasticity and sound proofing properties greatly superior to existing floor coverings.

I claim:

A composition of matter for the filling of horse shoes, comprising disintegrated soft rubber held together by a binder composed of gutta-percha 50%, caoutchouc 10%, resin 10%, paraffin 30%, and benzoic acid.

In testimony whereof I affix my signature in presence of two witnesses.

ALBERT OETKER.

Witnesses:
ERNEST H. L. MUMMENHOFF,
IDA CHRIST. HAFERMANN.